United States Patent
Wang

(10) Patent No.: US 8,059,228 B2
(45) Date of Patent: Nov. 15, 2011

(54) POSITION STRUCTURE OF LIQUID CRYSTAL DISPLAY

(75) Inventor: Chih-Sheng Wang, Taoyuan County (TW)

(73) Assignee: Quanta Computer Inc. (TW)

( * ) Notice: Subject to any disclaimer, the term of this patent is extended or adjusted under 35 U.S.C. 154(b) by 1015 days.

(21) Appl. No.: 11/976,255

(22) Filed: Oct. 23, 2007

(65) Prior Publication Data

US 2008/0165100 A1    Jul. 10, 2008

(30) Foreign Application Priority Data

Jan. 8, 2007 (TW) .............................. 96100728 A

(51) Int. Cl.
*G02F 1/1333* (2006.01)
(52) U.S. Cl. ........................................... 349/60; 349/58
(58) Field of Classification Search ............... 349/58–60
See application file for complete search history.

(56) References Cited

U.S. PATENT DOCUMENTS

| | | | |
|---|---|---|---|
| 5,946,061 A | 8/1999 | Kurihara et al. | |
| 6,064,565 A | 5/2000 | Ishihara et al. | |
| 6,067,133 A * | 5/2000 | Niibori et al. | 349/60 |
| 7,599,016 B2 * | 10/2009 | Lo et al. | 349/58 |

FOREIGN PATENT DOCUMENTS

| | | |
|---|---|---|
| CN | 2649857 Y | 10/2004 |
| CN | 2802911 Y | 8/2006 |
| TW | 545611 | 8/2003 |

* cited by examiner

*Primary Examiner* — Dung T. Nguyen
(74) *Attorney, Agent, or Firm* — Rabin & Berdo, PC

(57) ABSTRACT

A position structure of a liquid crystal display for positioning a display panel in a display cover is disclosed. The position structure includes a position piece, a position protrusion, and a position breach. The position piece is placed between the display panel and the display cover to absorb a tolerance between the display panel and the display cover. The position protrusion is formed on a sidewall of the display cover and the position breach is formed on the position piece. The position breach is disposed corresponding to the position protrusion. The position protrusion may couple with the position breach to fix the position piece between the display panel and the display cover.

16 Claims, 2 Drawing Sheets

POSITION STRUCTURE OF LIQUID CRYSTAL DISPLAY

RELATED APPLICATIONS

This application claims priority to Taiwan Application Serial Number 96100728, filed Jan. 8, 2007, which is herein incorporated by reference.

BACKGROUND

1. Field of Invention

The present invention relates to a liquid crystal display (LCD). More particularly, the present invention relates to a position structure of the LCD.

2. Description of Related Art

Liquid crystal displays (LCD) has many advantages over other conventional types of displays including high display quality, small volume occupation, lightweight, low voltage driven and low power consumption. Hence, LCD are widely used in portable devices, such as small televisions, mobile telephones, video recording units, notebook computers, desktop monitors, projector televisions and so on. Therefore, LCDs have gradually replaced the conventional cathode ray tube (CRT) as a trend for display unit.

The main LCD components include a display panel and a display cover. The display panel may be screwed in the display cover. However, an unwanted tolerance is generated when the display panel and the display cover are fabricated, and a gap is formed between the display panel and the display cover. Thus, the display panel is difficult to be positioned firmly and the display panel may be damaged easily while colliding with the display cover and.

For the foregoing reasons, there is a need for reducing the display panel position inaccuracy caused by the tolerance in the LCD.

SUMMARY

The invention provides a position structure of a liquid crystal display for positioning a display panel in a display cover. The position structure includes a position piece, a position protrusion, and a position breach. The position piece is placed between the display panel and the display cover to absorb a tolerance between the display panel and the display cover. The position protrusion is formed on a sidewall of the display cover and the position breach is formed on the position piece. The position breach is disposed corresponding to the position protrusion. The position protrusion may couple with the position breach to fix the position piece between the display panel and the display cover.

The invention also provides a liquid crystal display. The liquid crystal display includes a display cover, a display panel placed in the display cover, and a position piece. The display cover has a sidewall and a position protrusion disposed on the sidewall. The position piece is placed between the sidewall and the display panel to absorb a tolerance between the display panel and the display cover. The position piece has a position breach formed corresponding to the position protrusion. The position protrusion may couple with the position breach to fix the position piece between the display panel and the display cover.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
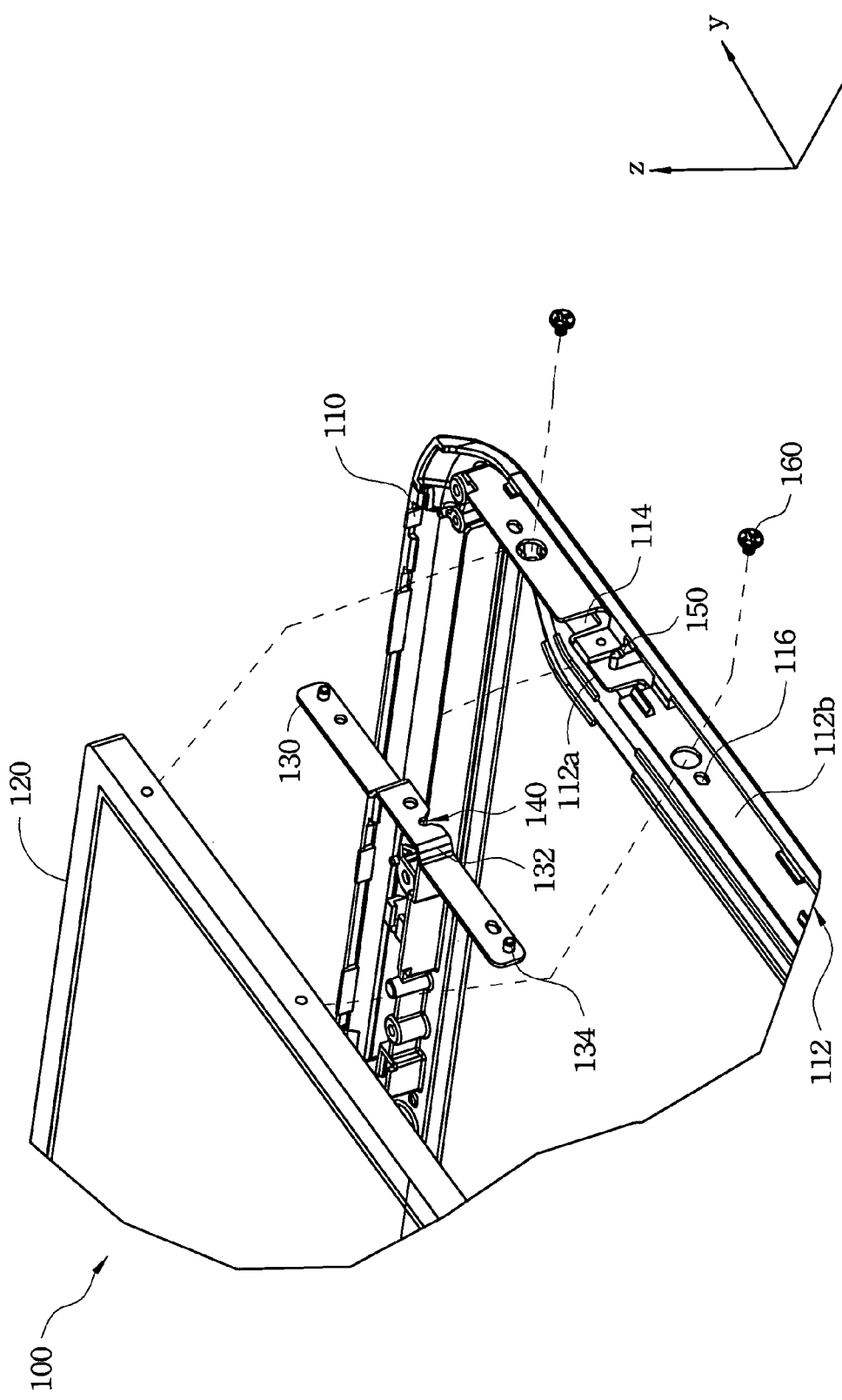
FIG. 1 is an exploded diagram of an embodiment of a position structure of a liquid crystal display of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates an exploded diagram of a position structure of a liquid crystal display of the invention. The liquid crystal display (LCD) 100 includes a display cover 110, a display panel 120, and the position structure for positioning the display panel 120 in the display cover 110. The position structure includes a position piece 130, a position breach 140, and a position protrusion 150. The position piece 130 is placed between the display panel 120 and the display cover 110. The position protrusion 150 is formed on a sidewall 112 of the display cover 110. The position breach 140 is formed on the position piece 130 and corresponds to the position protrusion 150. The position piece 130 may be fixed between the display cover 110 and the display panel 120 by coupling the position protrusion 150 and the position breach 140.

The display panel 120 is placed on another sidewall tightly opposite to the position piece 130 of the display cover. The sidewall opposite to the position piece 130 may be regarded as a reference surface for LCD assembly. In one embodiment, the position piece 130 may be a flexible piece. The flexible direction of the position piece 130 is the same as the direction of the tolerance between the display cover 110 and the display panel 120, i.e. the x direction. Thus, the position piece 130 could absorb the tolerance between the display cover 110 and the display panel 120.

Refer to FIG. 1. The position piece 130 may have a plurality of bending portions 132. The sidewall 112 of the display cover 110 has a plurality of passages 114 formed corresponding to the bending portions 132. The passage 114 may divide the sidewall 112 to at least one inner sidewall 112a and at least one outer sidewall 112b. The bending portions 132 may be placed across through the passages 114 to place the position piece 130 between the inner sidewall 112a and the outer sidewall 112b and improve the mechanical strength of the position piece 130 in the z direction. Preferably, each bending portion 132 may be bent at a right angle.

The position structure further includes at least one position pin 134 and at least one position hole 116. The position pin 134 may be disposed on a surface of the position piece 130 facing the sidewall 112. The position hole 116 corresponding to the position pin 134 may be disposed on the sidewall 112 of the display cover 110. The position pin 134 may couple with the position hole 116 to fix the position piece 130. Preferably, the position hole may be an elliptic hole to restrict the shift of the position piece 130 in the z direction.

The embodiment is not used to restrict the number or the type position structures. For example, there may be a plurality of the position pieces 130, the position protrusion 150 may be formed on the position piece 130 and the position breach 140 may be formed on the display cover 110, or the position hole 116 may be formed on the position piece 130 and the position pin 134 may be formed on the display cover 110.

Figure 2:
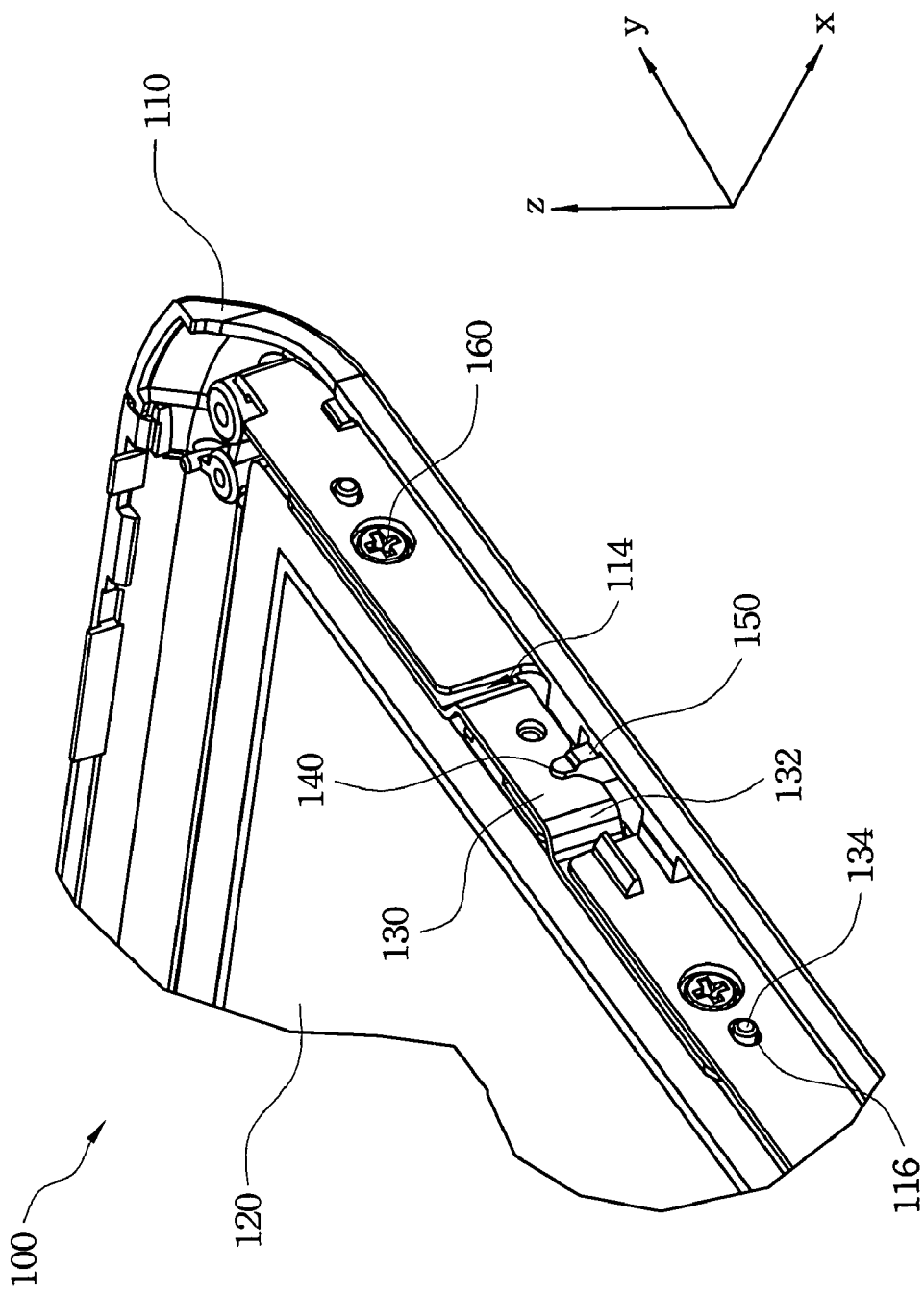
FIG. 2 is an assembly schematic diagram of an embodiment of the liquid crystal display of the invention.

The LCD 100 may have a plurality of screws 160 to screw the display panel 120 in the display cover 110. The assembly schematic diagram of an embodiment of the LCD 100 is illustrated in FIG. 2. The position piece 130 is a flexible piece and the flexible direction is same as the x direction to absorb the tolerance between the display panel 120 and the display cover 110. The bending portions 132 are placed cross through the passages 114 to improve the mechanical strength of the position piece 130 in the z direction. The position breach 140 of the position piece 130 may couple with the position protrusion 150 of the display cover 110 to restrict the shift of the position piece 130 in the y direction. The position pin 134 of the position piece 130 may couple with the elliptic position hole 116 of the display cover 110 to restrict the shift of the position piece 130 in the z direction. Thus, the position piece 130 can be fixed between the display cover 110 and the display panel 120 without screws.

According to the above embodiments, the flexible position piece placed between the display cover and the display panel may absorb the tolerance between the display cover and the display panel for easily assembly the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A position structure of a liquid crystal display for positioning a display panel in a display cover, the position structure comprising:
    a position piece placed between the display panel and the display cover to absorb a tolerance between the display panel and the display cover;
    a position protrusion formed on a sidewall of the display cover;
    a position pin disposed on a surface of the position piece facing the sidewall; and
    a position breach formed on the position piece corresponding to the position protrusion, wherein the position protrusion couples with the position breach to fix the position piece between the display panel and the display cover.

2. The position structure of a liquid crystal display of claim 1, wherein the position piece is a flexible piece.

3. The position structure of a liquid crystal display of claim 2, wherein the position piece comprises a plurality of bending portions, the sidewall of the display cover comprises a plurality of passages corresponding to the bending portions, the bending portions are placed cross through the passages.

4. The position structure of a liquid crystal display of claim 3, wherein the bending portions are bent at a right angle.

5. The position structure of a liquid crystal display of claim 2, wherein the position piece comprises a plurality of bending portions, the sidewall comprises at least one inner sidewall and at least one outer sidewall, wherein the position piece is placed between the inner sidewall and the outer sidewall by the bending portions.

6. The position structure of a liquid crystal display of claim 5, wherein the bending portions are bent at a right angle.

7. The position structure of a liquid crystal display of claim 1, wherein the position structure comprises a position hole disposed on the sidewall of the display cover corresponding to the position pin, wherein the position pin fit with the position hole to fix the position piece.

8. The position structure of a liquid crystal display of claim 7, wherein the position hole is an elliptic hole.

9. A liquid crystal display, comprising:
    a display cover comprising a sidewall and a position protrusion disposed on the sidewall;
    a display panel placed in the display cover; and
    a position piece placed between the sidewall and the display panel to absorb a tolerance between the display panel and the display cover, wherein the position piece has a position breach formed corresponding to the position protrusion and a position pin disposed on a surface of the position piece facing the sidewall, the position protrusion couples with the position breach to fix the position piece between the display panel and the display cover.

10. The liquid crystal display of claim 9, wherein the position piece is a flexible piece.

11. The liquid crystal display of claim 10, wherein the position piece comprises a plurality of bending portions, the sidewall of the display cover comprises a plurality of passages corresponding to the bending portions, the bending portions are placed cross through the passages.

12. The liquid crystal display of claim 11, wherein the bending portions are bent at a right angle.

13. The liquid crystal display of claim 10, wherein the position piece comprises a plurality of bending portions, the sidewall comprises at least one inner sidewall and at least one outer sidewall, wherein the position piece is placed between the inner sidewall and the outer sidewall by the bending portions.

14. The liquid crystal display of claim 13, wherein the bending portions are bent at a right angle.

15. The liquid crystal display of claim 9, wherein the display cover comprises a position hole disposed on the sidewall of the display cover corresponding to the position pin, wherein the position pin fits with the position hole to fix the position piece.

16. The liquid crystal display of claim 15, wherein the position hole is an elliptic hole.

* * * * *